United States Patent
Schroeder et al.

(10) Patent No.: US 6,489,761 B1
(45) Date of Patent: Dec. 3, 2002

(54) MAGNETIC ARRANGEMENT FOR AN ANALOG ANGLE ENCODER

(75) Inventors: Thaddeus Schroeder, Rochester Hills, MI (US); Bruno Patrice Bernard, Troy, MI (US); Avoki M. Omekanda, Rochester Hills, MI (US); Thomas Wolfgang Nehl, Shelby Township, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/678,209

(22) Filed: Sep. 5, 2000

Related U.S. Application Data
(60) Provisional application No. 60/153,091, filed on Sep. 9, 1999.

(51) Int. Cl.[7] .............................. G01B 7/30; G01D 5/14; G01R 33/06
(52) U.S. Cl. .............................. 324/207.25; 324/207.2; 324/207.21; 123/617
(58) Field of Search .................. 324/207.2–207.25, 324/173, 174; 341/15; 123/617, 406.52, 406.58

(56) References Cited

U.S. PATENT DOCUMENTS

| | | | | |
|---|---|---|---|---|
| 3,317,829 A | * | 5/1967 | Kuhrt et al. | 324/207.2 X |
| 4,392,375 A | * | 7/1983 | Eguchi et al. | 324/207.21 X |
| 4,703,261 A | * | 10/1987 | Berchtold | 324/207.2 |
| 4,926,122 A | | 5/1990 | Schroeder et al. | 324/207.13 |
| 5,148,106 A | * | 9/1992 | Ozawa | 324/207.25 X |
| 5,252,919 A | * | 10/1993 | Uemura | 324/207.25 |
| 5,544,000 A | * | 8/1996 | Suzuki et al. | 324/207.2 X |
| 5,754,042 A | | 5/1998 | Schroeder et al. | 324/207.25 |
| 6,060,880 A | * | 5/2000 | Guyot et al. | 324/207.2 |
| 6,232,771 B1 | * | 5/2001 | Herden et al. | 324/207.25 |

FOREIGN PATENT DOCUMENTS

| | | | | |
|---|---|---|---|---|
| CA | 1232957 | | 2/1988 | |
| DE | 2001368 | * | 7/1971 | 324/207.2 |
| JP | 58-168913 | * | 10/1983 | 324/207.2 |
| JP | 02-122205 | * | 5/1990 | 324/207.2 |
| JP | 4-20812 | * | 1/1992 | 324/207.2 |

\* cited by examiner

*Primary Examiner*—Gerard R. Strecker
(74) *Attorney, Agent, or Firm*—Margaret A. Dobrowitsky

(57) ABSTRACT

An analog angle encoder includes a non-magnetic stator which is cup-shaped, having a central post carrying at least one magnetosensitive device, and further including a rotor in the form of a ring captured by the stator, the rotor carrying at least one permanent magnet, wherein the rotor is rotatable relative to the stator. As the rotor rotates relative to the stator, the angle of the incident magnetic field changes relative to the magnetosensitive device, thereby causing the output from the device to vary sinusoidally with angular position. It is preferred to use magnetic configurations other than simple six sided magnets in order to achieve a more uniform magnetic field at the magnetosensitive device, as for example by utilizing cylindrical magnets, arcuate (concave faced) magnets, flat ferromagnetic layer pole pieces, arcuate (concave faced) ferromagnetic layer pole pieces, and ferromagnetic return paths.

3 Claims, 8 Drawing Sheets

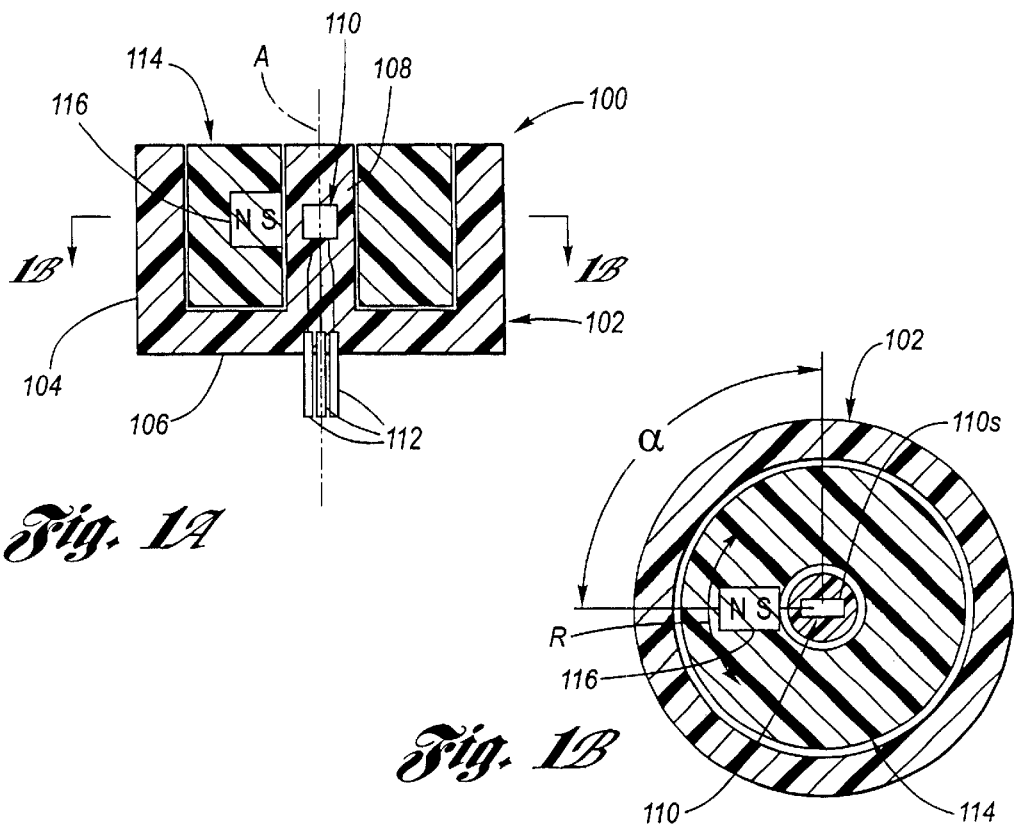
*Fig. 1A*
*Fig. 1B*
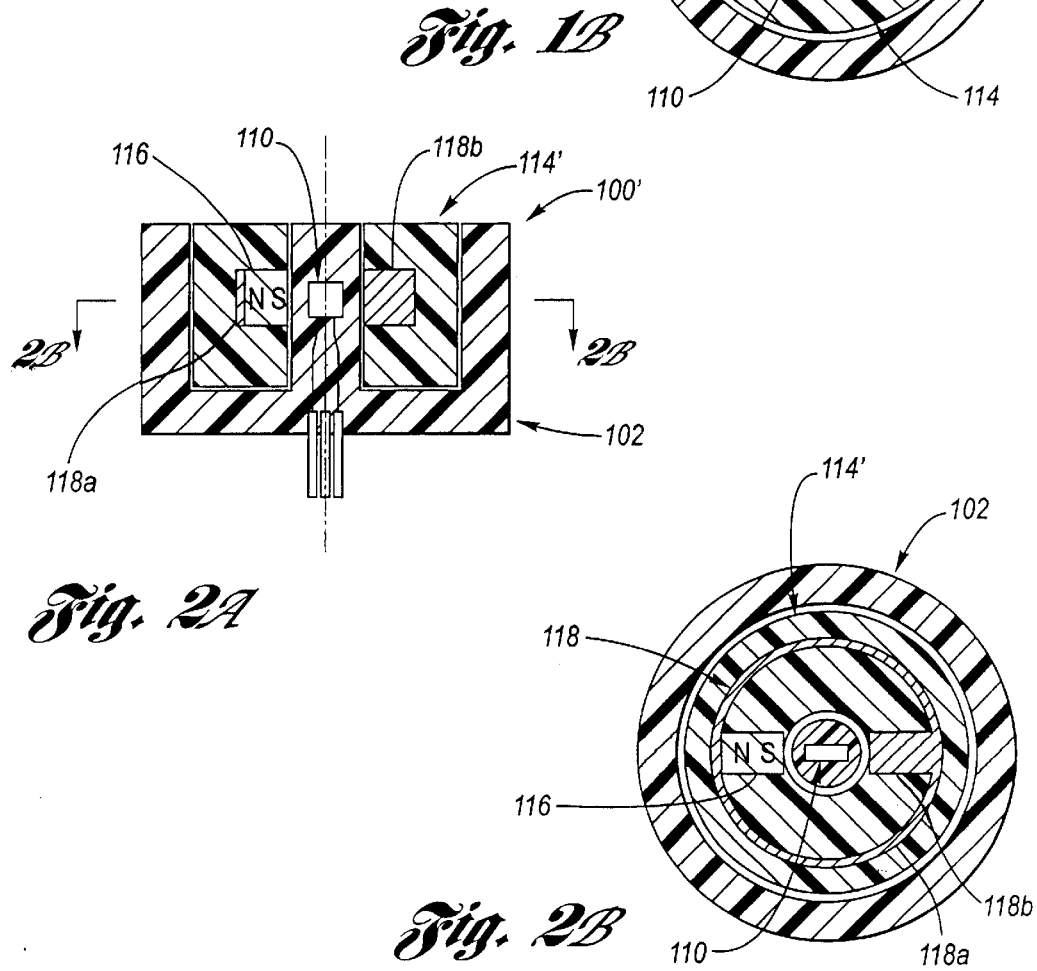
*Fig. 2A*
*Fig. 2B*

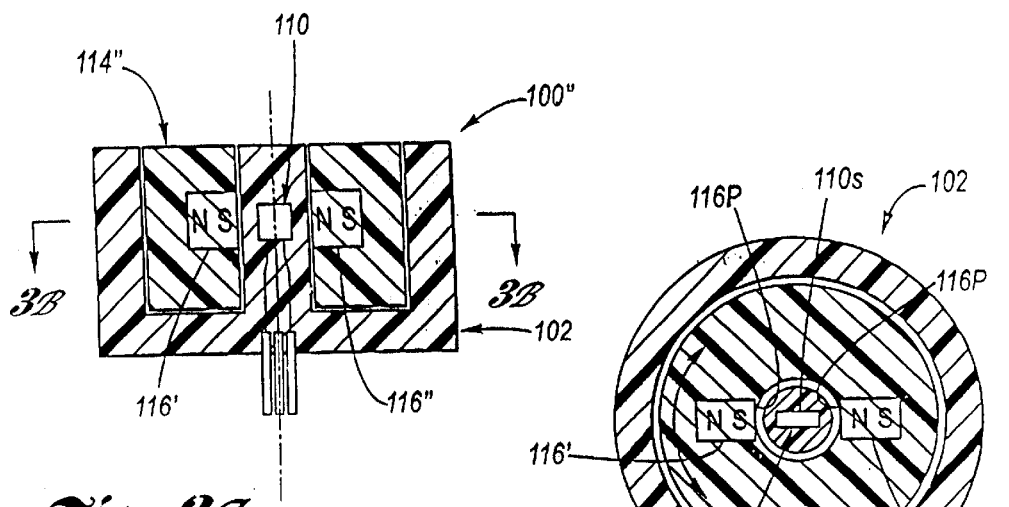
Fig. 3A
Fig. 3B
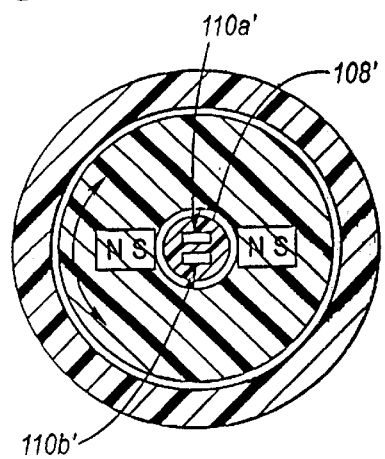
Fig. 4A
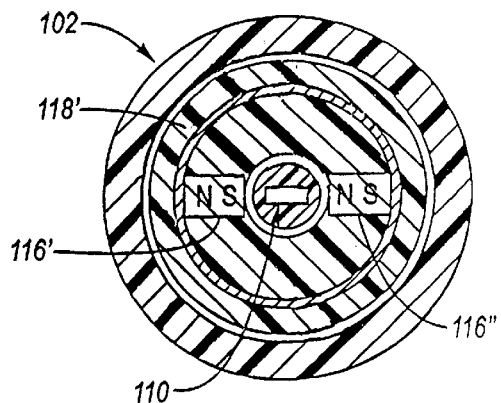
Fig. 3C
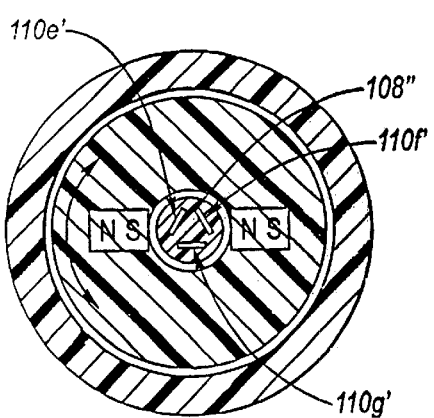
Fig. 4C
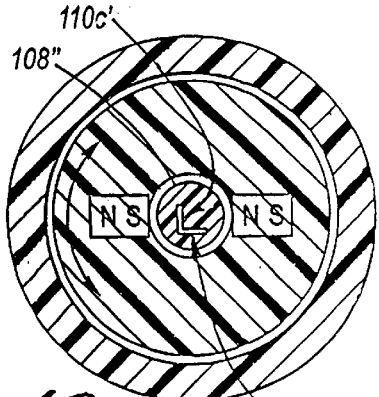
Fig. 4B

MAGNETIC ARRANGEMENT FOR AN ANALOG ANGLE ENCODER

CROSS-REFERENCE TO RELATED APPLICATIONS

The present application is a continuation-in-part application of provisional application Ser. No. 60/153,091, filed on Sep. 9, 1999, which application is currently pending.

TECHNICAL FIELD

The present invention relates to rotary magnetic position sensors used to measure angular displacements.

BACKGROUND OF THE INVENTION

The use of magnetoresistors (MRs) and Hall devices as position sensors is well known in the art. For example, a magnetically biased differential MR sensor may be used to sense angular position of a rotating toothed wheel, as for example exemplified by U.S. Pat. No. 5,754,042.

Position sensors with digital outputs provide discrete position information only whereas an analog position sensor can provide both position information and outputs that can be used to drive an electric motor or other similar electromechanical devices. Many of these devices are driven by sinusoidal excitations as a function of position. Consequently, an analog position sensor having an output that varies sinusoidally with position could be used to generate absolute angular positions as, for example, an electrical power steering system to measure the angle of rotation of the steering wheel, and/or reference signals to produce the desired sinusoidal phase drive currents and voltages to drive electric motors and other similar electromechanical devices.

Applications may further include throttle position sensors, pedal position sensors in drive-by-wire systems, body height position sensors for automotive suspension systems, a 3-phase sine generator for brushless motors, a sine/cosine resolver for servo motors, etc.

The operational principle of an angle encoder sensor is based upon the property of Hall plates and semiconductor magnetoresistors, collectively referred to herein as magnetosensitive devices, to sense only the normal component of the magnetic field passing through them. Consequently, if a constant and uniform magnetic field is rotated in the plane perpendicular to the surface of a magnetosensitive device, the output signal will vary as the cosine of the angle between the direction of the incident magnetic field lines and the line normal to the surface of the device. It is preferred in this regard, that the magnetosensitive device be linear in its response to change in direction of the incident magnetic field, such as that provided by Hall plates; however, magnetoresistors operating in their linear region can also be used. In addition, operation over any ambient temperature range may require temperature compensated magnetosensitive devices. Also, it should be noted that included by the term "magnetosensitive devices" are ferromagnetic magnetoresistors, including giant magnetoresistor (GMR) sensors, which can also be used although these are less preferred because their resistance versus magnetic flux density saturates at a relatively low level compared with Hall sensors that do not saturate.

Accordingly, what remains needed is a compact inexpensive contactless position sensor having a sinusoidally varying output suitable for specialized sensing schemes.

SUMMARY OF THE INVENTION

The present invention is an analog angle encoder, wherein rotation of a magnetic field relative to a magnetosensitive device provides a varying output of the magnetosensitive device that varies sinusoidally with the angle of relative rotation.

The analog angle encoder according to the present invention includes a non-magnetic stator which is preferably cup shaped, having an outer annulus, a bottom disk and a central post connected with the bottom disk and concentrically positioned relative to the outer annulus. Located within the central post is located at least one magnetosensitive device, the leads of which pass out from the cup. A rotor in the form of a ring captured between the central post and the outer annulus is provided, wherein the ring is rotatable relative to the stator.

At least one magnet is positioned within the rotor so as to provide a magnetic field incident upon the at least one magnetosensitive device. As the rotor rotates relative to the stator, the angle of the incident magnetic field changes relative to the magnetosensitive device, thereby causing the output from the device to vary sinusoidally with angular position.

While it is possible to use a single magnet, in order to provide a more uniform incident magnetic field it is preferred for a pair of opposed magnets to be used, located on diametrically opposite sides of the central post. In this regard further, it is preferred to use magnetic configurations other than simple six sided magnets in order to achieve a yet more uniform incident magnetic field, as for example by utilizing cylindrical magnets, arcuate (concave faced) magnets, flat ferromagnetic layer pole pieces, arcuate (concave faced) ferromagnetic layer pole pieces, and ferromagnetic return paths.

Accordingly, it is an object of the present invention to provide an analog angle encoder having improved signal response accuracy to sensed relative rotation.

This, and additional objects, features and benefits of the present invention will become apparent from the following specification.

BRIEF DESCRIPTION OF THE DRAWINGS

FIG. 1A is a partly sectional side view of a first example of an analog angle encoder according to the present invention.

FIG. 1B is a partly sectional view, seen along line 1B—1B in FIG. 1A.

FIG. 2A is a partly sectional side view of a second example of an analog angle encoder according to the present invention.

FIG. 2B is a partly sectional view, seen along line 2B—2B in FIG. 2A.

FIG. 3A is a partly sectional side view of a third example of an analog angle encoder according to the present invention.

FIG. 3B is a partly sectional view, seen along line 3B—3B in FIG. 3A.

FIG. 3C is a partly sectional view as in FIG. 3B, now showing a flux path return ring.

FIG. 4A is a partly sectional top view of an analog angle encoder according to the present invention, wherein the magnetosensitive device is redundant.

FIG. 4B is a partly sectional top view of an analog angle encoder according to the present invention, wherein the magnetosensitive devices are orthogonal to each other.

FIG. 4C is a partly sectional top view of an analog angle encoder according to the present invention, wherein three magnetosensitive devices are spaced 120 degrees apart.

DESCRIPTION OF THE PREFERRED EMBODIMENT

Figure 5:
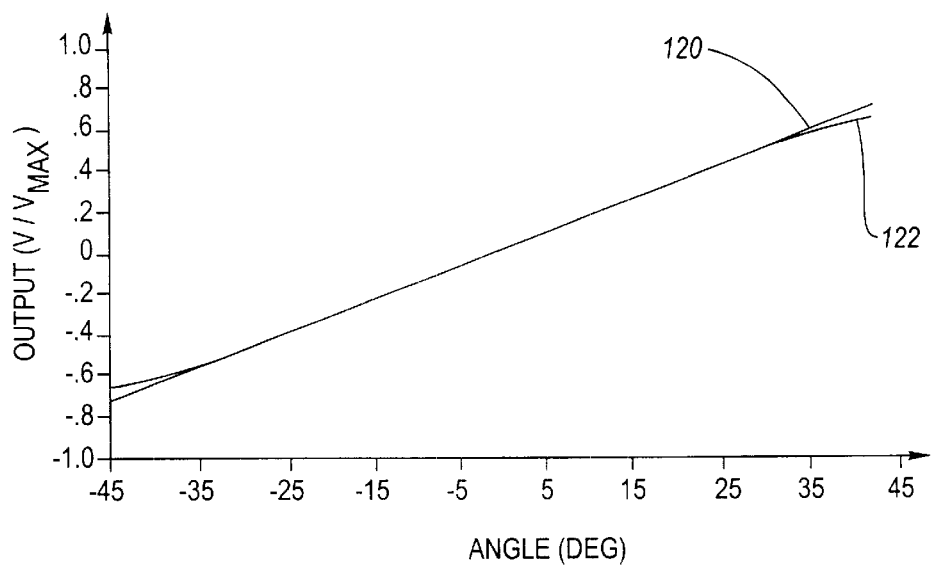
FIG. 5 is a graph indicating output of the analog angle encoder according to the present invention as a function of angular position.

Turning attention now to the Drawings, FIGS. 1A and 1B depict a first example of the analog angle encoder 100. A stator 102 in the form of a cup has an outer annulus 104, an integrally connected bottom disk 106 and a central post 108 connected with the bottom disk and concentrically positioned relative to the outer annulus. The stator is composed of a nonmagnetic material, such as for example plastic.

Inserted or molded within the central post 108 is located a magnetosensitive device 110, its sensing surface 110s being oriented parallel to the axis of symmetry A of the cup 102. The magnetosensitive device may be, for example, a Hall plate or a magnetoresistor, or a Hall plate or magnetoresistor with its interface electronics. The leads 112 of the magnetosensitive device 110 pass outwardly from the stator 102.

A rotor 114 in the form of a ring is captured between the central post 108 and the outer annulus 104, wherein the rotor is rotatable, contactlessly or surface-to-surface slidably, relative to the stator 102 about an axis of rotation, which axis is identically the axis of symmetry A. For example, the rotor 114 may be connected to a rotatable shaft, and the stator 102 may be connected to a stationary article. The rotor 114 is composed of a non-magnetic material, such as plastic, except as indicated hereinbelow. The rotation R of the rotor 114 may be unlimited or restricted to some predetermined angular interval (for example 90 degrees in the case of a throttle position sensor).

A bias magnet 116, of either the permanent type (preferred) or the electromagnet type, is rigidly attached within the rotor 114. The bias magnet provides a magnetic field perpendicular to the axis of symmetry A so as to immerse the magnetosensitive device 110 in a constant incident magnetic field, wherein the details of providing a constant incident magnetic field will be elaborated hereinbelow.

In operation, as the rotor 114 rotates relative to the stator 102 (that is, as the magnet 116 rotates relative to the magnetosensitive device 110), only the angle changes between the magnetic field lines of the bias magnet 116 and the sensing surface 110s, thereby causing the magnetosensitive device to responsively generate an output signal that is proportional to the cosine of the deviation angle α from normal to the sensing surface 110s.

The analog angle encoder 100 may be modified in a variety of ways to achieve a particular goal. Turning attention now to FIGS. 2A through 4C, alternative embodiments of the analog angle encoder according to the present invention will be described, wherein, generally, like parts are like numbered, and changed but analogous parts are like numbered with a prime, and new parts are newly numbered.

FIGS. 2A and 2B depict an analog angle encoder 100' having a stator 102 as described, wherein the magnetics are improved (that is, the magnetic field is made more constant at the magnetosensing device 110) by providing a ferromagnetic return path member 118 for completing the magnetic circuit. For example a steel ring 118a is embedded in the rotor 114', and a steel keeper 118b is located diametrically opposite the magnet 116.

FIGS. 3A and 3B depict an analog angle encoder 100" having a stator 102 as described, wherein, and more preferably, two diametrically opposed first and second magnets (permanent, which is preferred, or electromagnet) 116' and 116" are located in the rotor 114" equidistant from the magnetosensitive device 110 to thereby provide an even more constant magnetic field at the magnetosensing device 110. FIG. 3C depicts an improved variation, wherein each of the first and second magnets 116', 116" are interfaced with a ferromagnetic return path member 118' for completing the magnetic circuit between the outwardly facing poles of the first and second magnets. By improving the constancy of the magnetic field at the magnetosensitive device 110, accuracy of response of the output of the magnetosensitive device 110 to rotation is likewise improved.

Depending upon specific applications, there can be more than one magnetosensitive device embedded in the central post. For example as shown at FIG. 4A, redundancy requirements for throttle position sensors can be met by using two individual magnetosensitive devices 110a', 110b' embedded in the central post 108' in a side-by-side arrangement.

For example as shown at FIG. 4B, a sine/cosine resolver which requires two individual magnetosensitive devices is provided by embedding two magnetosensitive devices 110c' 110d' in the central post 108" in an orthogonal relation to each other. A sine/cosine resolver would be of particular relevance where speed of rotation is desired. It is know that the derivative of a sine is a cosine, therefore:

$$\frac{d(\cos\alpha)}{dt} = \frac{d\alpha}{dt}\sin\alpha, \text{ and } \frac{d\alpha}{dt} = \frac{\left(\frac{d\cos\alpha}{dt}\right)}{\sin\alpha}$$

so that the speed of rotation can be obtained by differentiating one output of the sine/cosine resolver, and dividing the result by the other output of the sine/cosine resolver.

Further for example as shown at FIG. 4C, a 3-phase sine generator would use three individual magnetosensitive devices provided by embedding three magnetosensitive devices 110e', 110f', 110g' in the central post 108" in an arrangement 120 degrees apart in relation to each other about the aforementioned axis of symmetry. The use of magnetoresistors for the magnetosensitive devices provides two sine wave outputs per revolution for each magnetoresistor, since magnetoresistors are insensitive to magnetic polarity; this feature can be very useful for the control of multi-pole electric motors. The individual magnetosensitive device in each case can be replaced with a dual magnetosensitive device operating in differential mode, thus increasing the output signal and potentially allowing compensation for nonlinearity over a particular angular range.

There are two ways to extract the angular position from the proposed sensors. One consists of calculating the arccosine of the sensor output signal. Alternatively, it may be recalled that a sine function is, to a first degree, linear about the origin. Therefore, for cases where only a limited range of angles is desired, one could use the sensor signal directly as an estimate of angle. FIG. 5 illustrates this alternative approach, wherein FIG. 5 is a graph which charts data of angle of rotation versus normalized voltage output 120 for an analog angle encoder according to the present invention and versus ideal linear response 122. The graph indicates that if properly selected, even a 90 degree angular interval of magnetosensitive device rotation can provide fairly good linearity and a small amount of compensation would suffice to obtain total linearity.

Figure 6:
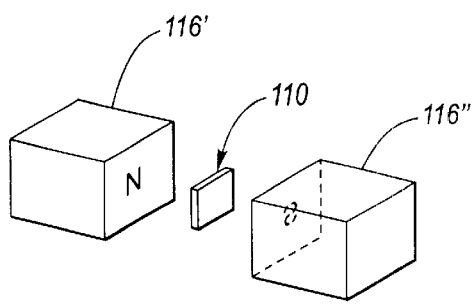
FIG. 6 is a diagrammatic, broken-away perspective view of the analog angle encoder of FIGS. 3A and 3B.

FIG. 6 is a broken-away schematic view of the analog angle encoder as shown at FIGS. 3A and 3B, wherein only the first and second magnets 116', 116" and the magnetosensitive device 110 are shown. The first and second magnets 116', 116" each have a six-sided rectangular configuration. A six-sided configuration has the problem that the four edges of the magnets parallel to the direction of magnetization (that is, at the magnetic pole faces) will influence the shape of the area of uniform flux density seen by the magnetosensitive device located equidistant between them. This will have the effect of increasing the impact of eccentricities and other manufacturing tolerances. These edge effects can be eliminated by using cylindrical magnets.

Figure 7A:
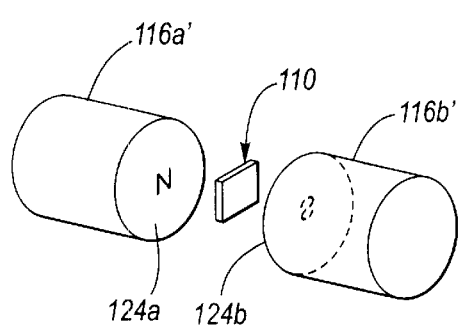
FIG. 7A is a diagrammatic, broken-away perspective view as in FIG. 6, wherein a first alternative magnetic arrangement is shown.
Figure 7B:
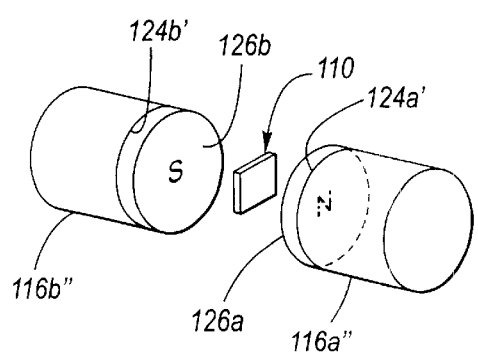
FIG. 7B is a diagrammatic, broken-away perspective view as in FIG. 6, wherein a second alternative magnetic arrangement is shown.

As shown at FIG. 7A which is a broken-away view of an analog angle encoder according to the present invention similar to that of FIG. 6, a pair of opposed cylindrical magnets 116a', 116b' are located equidistant from the magnetosensitive device 110. The cylinder faces 124a, 124b (which also are the magnetic pole faces (north facing south) are oriented facing the magnetosensitive device 110. As shown at FIG. 7B which is also a broken-away view of an analog angle encoder according to the present invention similar to that of FIG. 6, a pair of opposed cylindrical magnets 116a", 116b" are located equidistant from the magnetosensitive device 110. The cylinder faces 124a', 124b' (which also are the magnetic pole faces (north facing south)) are provided with flat or concavely shaped ferromagnetic pole-pieces 126a, 126b which are oriented facing the magnetosensitive device 110 so as to further control magnetic field distribution. Additional improvements are possible by use of a ferromagnetic flux path member to complete the magnetic circuit, as shown at FIG. 3C, which connects the outward directed faces of the magnets.

Turning attention now to FIGS. 8A through 11 considerations for providing a constant magnetic field at the magnetosensitive device of the analog angle encoder according to the present invention will be discussed in detail.

Returning for a moment to FIG. 3B, the first and second magnets 116', 116", provide a magnetic field which is to some extent uniform, that is, the magnetic flux lines between the two magnets are essentially perpendicular to the magnet pole surfaces 116p. Therefore, the magnitude of the flux density is uniformly equal to some value B in the air gap therebetween. Since magnetosensitive devices 110 are sensitive to the component of flux density which is perpendicular to the device surface 110s, if the magnetosensitive device rotates within the uniform magnetic field B, the signal output of the magnetosensitive device will be proportional to $B_x(\cos(\alpha))$, where, as defined hereinabove, $\alpha$ is the amount of angular rotation.

Figure 8A:
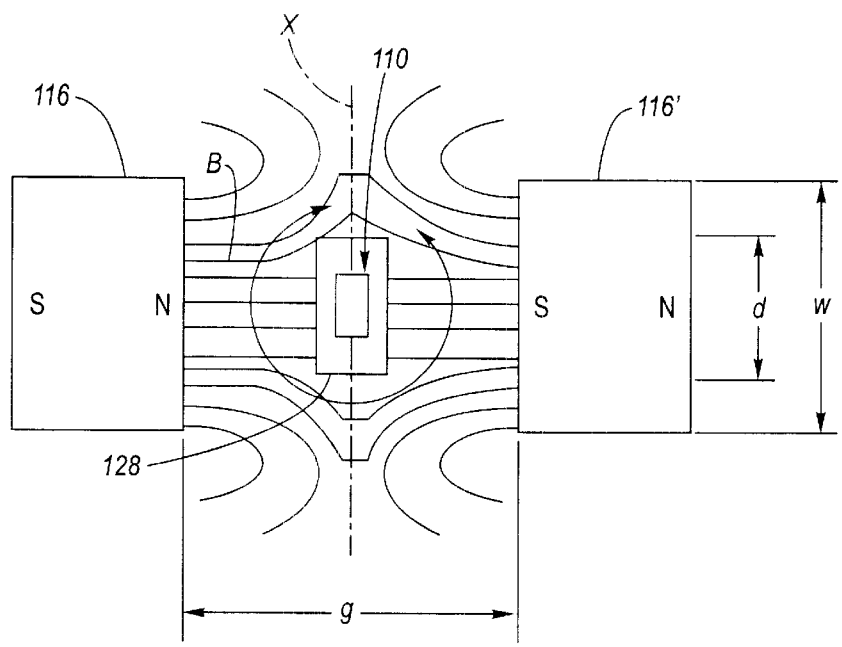
FIG. 8A is a first magnetic field diagram of the analog angle encoder of FIG. 6.

In practice, as shown at FIG. 8A (which is a broken-away view of the analog angle encoder according to the present invention as depicted in FIGS. 6, 7A and 7B), the magnetosensitive device 110, while small in itself (for example 0.5 mm by 0.5 mm), is located within a larger magnetosensor package 128 (for example having a width d of 3 mm), so that the exact position of the magnetosensitive device may not be known precisely. Moreover, in order to make for inexpensive assembly, the magnetosensor package 128 may not be located quite in the middle of the area between the first and second magnets 116', 116". Also, as discussed hereinabove, it may be desirable to locate two or more magnetosensitive devices 110 in the gap g to have for example quadrature or redundancy. It is therefore critical to design the analog angle encoder according to the present invention in such a way that the magnetic field B between the first and second magnets 116', 116" is as uniform as possible over an area at least as large as the magnetosensitive device width d. The discussion below is directed to providing a large region of uniform magnetic field between the first and second magnets within the smallest possible over-all package size.

Following are three principles which, if observed, will provide a uniform magnetic field in a sufficiently wide area.

1. With rectangular magnets, as shown at FIG. 8A, the magnet width w must be of a specific width which is much wider than the desired width d of uniform magnetic field, specifically on the order of 14 mm for g=4 mm, or 12 mm for g=4 mm, where g is the gap between the two magnets.

2. The addition of a ferromagnetic layer on the magnet surfaces will make it possible to use magnets not quite as wide (in the case of rectangular magnets as shown in FIG. 8A, the required magnet width is 12 mm for g=6 mm or 10 mm for g=4 mm). At least as importantly, thanks to the ferromagnetic layer, wider magnets also provide more uniform magnetic fields.

3. Permanent magnets in the general form of arcuates provide uniform field with much smaller magnet widths.

The first of these principles is the simplest to design. The second principle, since it yields wide areas of uniform magnetic field, may be particularly well suited for configurations with multiple magnetosensitive devices. The third principle minimizes the magnet size, thus generally minimizing cost and packaging. Note that these three principles may be used either separately or together (ferromagnetic layer with arcuates).

Before proceeding, it may be useful to state that in these analog angle encoders, the air gap g is expected to be approximately as large as, or slightly larger than, the magnetosensor package width d, for the following reason. Since the present invention is an angular position sensor, the magnetosensitive device is set within a cylindrical package 128 which is in the form of a plastic central shaft (see FIGS. 1A through 4C) around which the magnet assembly is free to rotate. The clearance between the magnets is thus defined in a circular fashion, with the center of the circle in the center of the assembly. Therefore, the air gap g may be several millimeters long.

Figure 8B:
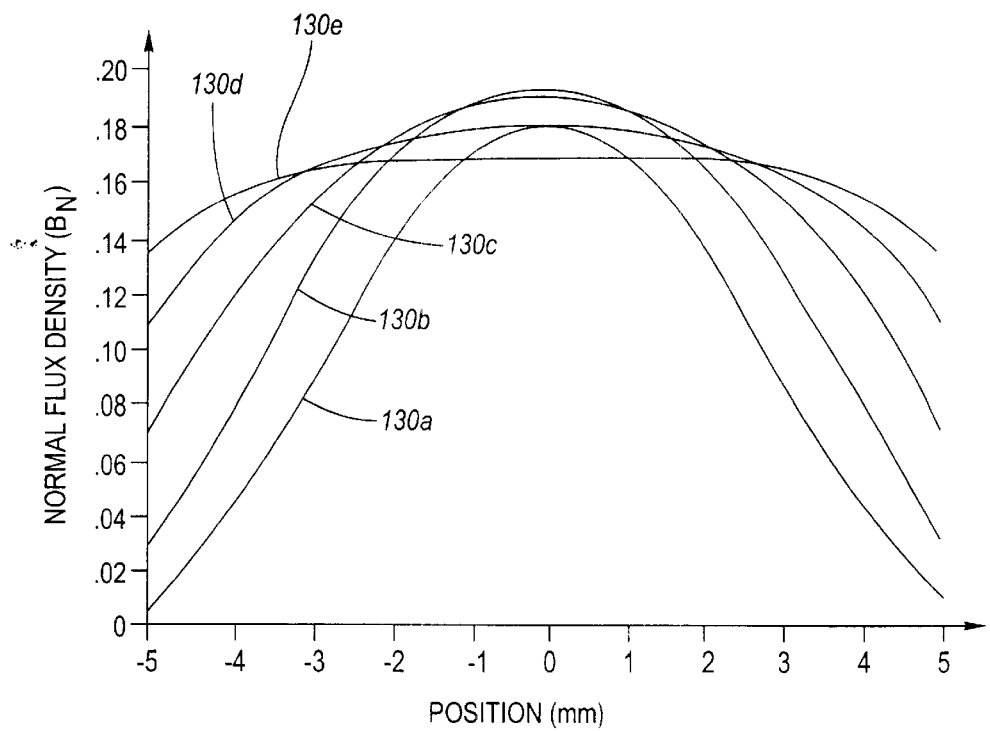
FIGS. 8B and 8C are graphs of magnetic field density as a function of gap for various magnet widths for the analog angle encoder of FIG. 8A.
Figure 8C:
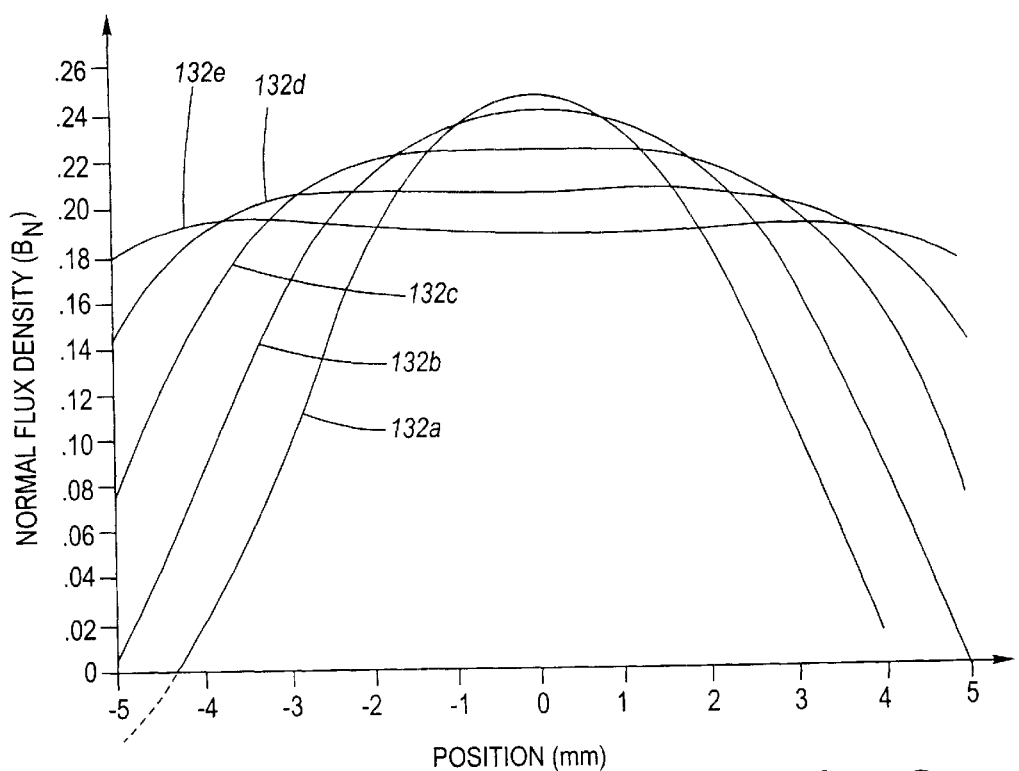

Referring to FIGS. 8A through 8C, desirable dimensions for rectangular magnets will be detailed.

As shown at FIG. 8A, the magnetic field distribution is distorted around the magnet edges because it is easier (that is, the reluctance of the magnetic circuit is lower) for the field to turn and go towards the back at the magnet rather than cross the air gap towards the other magnet. Actual magnetic flux plots were calculated with finite elements, in this regard. If the magnet width w is too small, the magnetic flux density at axis X (perpendicular to axis A in FIG. 1A), and having a component perpendicular thereto to which the magnetosensitive device 110 is sensitive, has a bell shape, as shown at FIG. 8B.

FIG. 8B is a plot by finite element analysis of normal flux density versus position along the X axis, wherein the first and second magnets 116', 116" are Vacomax model 145S Samarium-Cobalt (SmCo) magnets having a length of 3 mm, and wherein the gap g is equal to 6 mm. Plot 130a is for a magnet width of 6 mm, plot 130b is for a magnet width of 8 mm, plot 130c is for a magnet width of 10 mm, plot 130d is for a magnet width of 12 mm, and plot 130e is for a magnet width of 14 mm. As seen in FIG. 8B, as the magnet width is increased, the bell shape of the plots becomes flatter, and becomes essentially flat over a 4 mm wide area for plot 130e (w=14 mm). A flat plot characteristic indicates a uniform magnetic field across that area.

Similar results are shown in FIG. 8C, using the same magnets as for FIG. 8B, where now the gap g is equal to 4 mm. Plot 132a is for a magnet width of 6 mm, plot 132b is for a magnet width of 8 mm, plot 132c is for a magnet width of 10 mm, plot 132d is for a magnet width of 12 mm, and plot 132e is for a magnet width of 14 mm. The plot characteristic is seen to be flat for w=12 mm. Also, the bell shape of the plot characteristic is reversed for wider magnets. For example, if w=14 mm (plot 132e), the plot characteristic is concave instead of convex. For any air gap g, there is therefore a specific magnet width that provides a uniform magnetic field.

It is therefore possible to design analog angle encoders according to the present invention with a flat plot characteristic, wherein a uniform flux density is present over some defined area. This defined area is on the order of 4 mm width, and is realized with a 14 mm wide magnet if g=6 mm and a 12-mm wide magnet if g=4 mm. If other magnet widths are used, then the plot characteristic is slightly concave or convex. This would lead to some position inaccuracy if the magnetosensitive device is not positioned precisely in the center of the air gap. Such inaccuracy may be acceptable in some applications to reduce magnet cost, but not in others.

The design with rectangular magnets has the advantage of being conceptually simple, and easy to implement. It has, however, two shortcomings that the next two statements address. First, it should be noted that, for a given air gap g, the area over which the magnetic field is uniform is fairly specific, and requires a specific magnet width with little flexibility. In some applications requiring a very wide area of uniformity (such as if several magnetosensitive devices are placed in the air gap), this may be an issue. Second, it should be noted that the magnet size that guarantees magnetic field uniformity is not small (12 to 14 mm). If a high grade magnet material, such as SmCo, is used, then the larger size of the magnet is a factor to consider. Smaller magnets lead to small inaccuracies. Less expensive magnet materials, such as ferrite, are available, but they will yield smaller output signals from the magnetosensitive device.

Figure 9A:
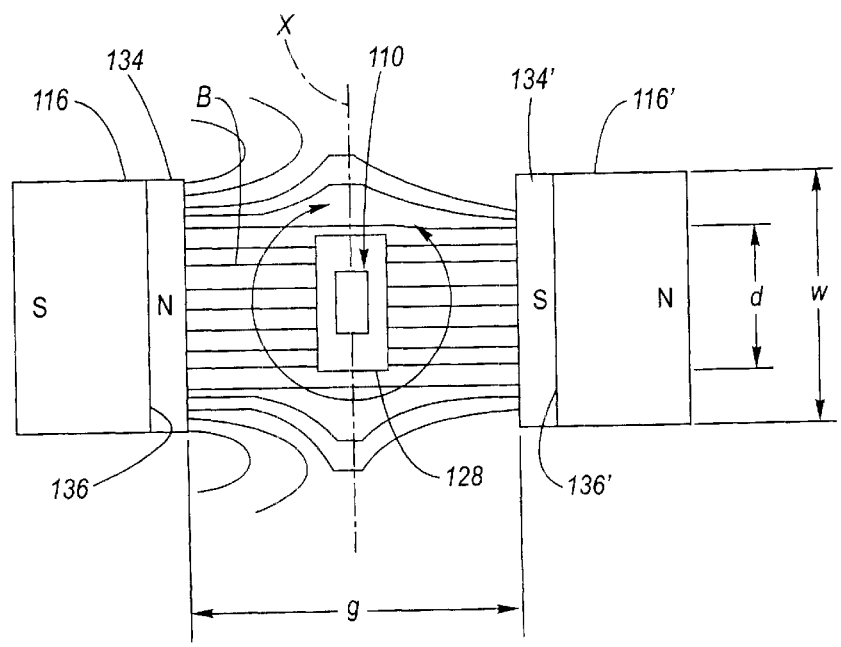
FIG. 9A is a first magnetic field diagram of the analog angle encoder similar to that of FIG. 6, but now with the addition of a flat ferromagnetic pole-piece at each magnet pole face.
Figure 9B:
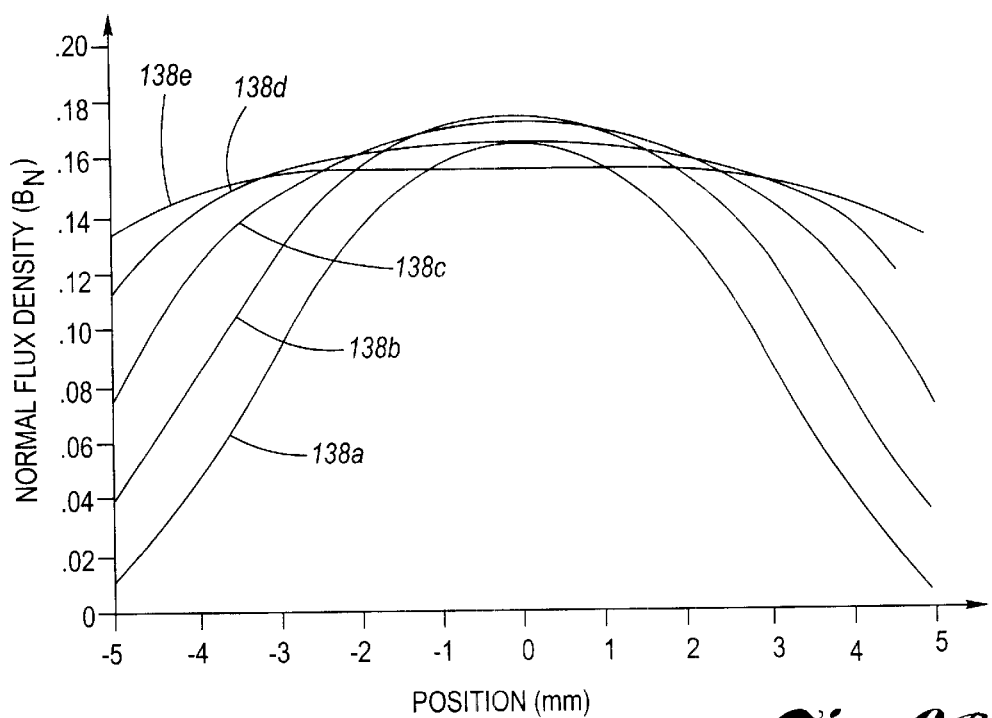
FIGS. 9B and 9C are graphs of magnetic field density as a function of gap for various magnet widths for the analog angle encoder of FIG. 9A.
Figure 9C:
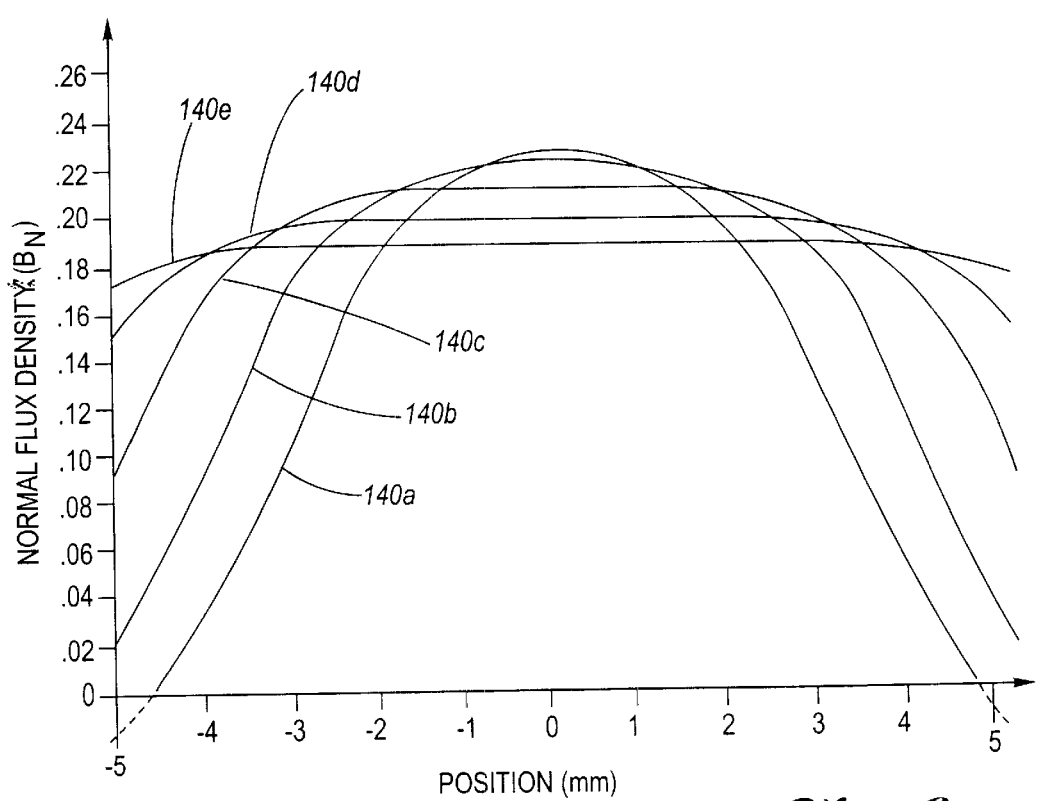

Referring now to FIGS. 9A through 9C, desirable dimensions with extended uniform magnetic field area for rectangular magnets will be detailed.

The addition of a ferromagnetic layer pole piece 134, 134' at each of the mutually facing pole faces 136, 136' of the magnets 116', 116", as shown at FIG. 9A, broadens the range over which the magnetic field is uniform. Such a ferromagnetic layer is similar to that described in U.S. Pat. No. 4,926,122. In the present case, however, it is useful for a different reason, namely because magnetic flux fines are always essentially perpendicular to iron surfaces, wherein the angle of incidence of the magnetic field vector at the boundary of two materials is related to the ratio of the respective permeabilities of the two materials. For iron versus air, the ratio is between 500 to 1000. For a permanent magnet versus air, it is on the order of 1. The ferromagnetic pole pieces 134, 134' need not be thick. Thicknesses on the order of 0.1 to 0.3 mm are sufficient to make sure that the iron is not saturated. Thicker ferromagnetic pole pieces are possible if needed for mechanical reasons without adverse magnetic effect, unless it is so thick (thicker than 1 or 2 mm) so as to cause severe magnetic leakage. In that respect, FIG. 9A is not to scale.

The results of finite element modeling for this configuration are shown in the graphical plots of FIGS. 9B and 9C. The magnets and their length are as in FIGS. 8B and 8C, the ferromagnetic layer pole pieces 134, 134' are each 0.1 mm thick iron, wherein in FIG. 9B plot 138a is for a magnet width of 6 mm, plot 138b is for a magnet width of 8 mm, plot 138c is for a magnet width of 10 mm, plot 138d is for a magnet width of 12 mm, and plot 138e is for a magnet width of 14 mm, and wherein in FIG. 9C plot 140a is for a magnet width of 6 mm, plot 140b is for a magnet width of 8 mm, plot 140c is for a magnet width of 10 mm, plot 140d is for a magnet width of 12 mm, and plot 140e is for a magnet width of 14 mm. FIGS. 8B and 8C may be directly compared with FIGS. 9B and 9C. For g=6 mm, (FIG. 9B), an area of uniform magnetic field extending over 3 mm can be seen with a 12 mm wide magnet (plot 138d), and over 5 mm for a 14 mm wide magnet (plot 138e). In other words and more generally, the flat area in the case of an air gap g of 6 mm is equal to the magnet width w minus 9 mm. For g=4 mm (FIG. 9C) an area of uniform field extending over 1 mm can be seen with an 8 mm wide magnet (plot 140b), over 3 mm for a 10 mm wide magnet (plot 140c). In other words and more generally, the flat area in the case of an air gap g of 4 mm is equal to the magnet width w minus 7 mm. It was noted when commenting on FIGS. 8B and 8C that the characteristic was going from concave to flat to convex as the magnet width was increased. With a ferromagnetic pole piece, while the same progression is likely, it takes place more slowly thus allowing for a much broader selection of magnet widths all yielding flat characteristics. Moreover, the flat area is seen to be equal to the magnet width minus a constant, thus providing easy guidelines to the designer.

The addition of the ferromagnetic layer pole pieces 134, 134' has therefore three advantages. Firstly, a smaller magnet is sufficient to obtain an area of uniform field. This is a cost advantage. Secondly, the needed magnet width for providing a uniform magnetic field is not so specifically related to air gap length g. This makes for more flexibility. For instance, the same magnet assembly could be used in different applications. Thirdly, much wider uniform magnetic field areas can be obtained (for w=14 mm (plot 140e) in FIG. 9C, the flat area is seen to extend over 8 mm). This is particularly important if several magnetosensitive devices are to be placed in the air gap.

As a final note, we found that the ferromagnetic layers may extend farther than the magnet width with no noticeable effect on performance. A longer ferromagnetic layer may thus be used if convenient for overall strength or ease of placement. Regardless of its width, the ferromagnetic layer may, or may not, be permanently affixed to the permanent magnet. Conceivably, the magnet and the ferromagnetic layer could be simply aligned together before being overmolded to make a permanent assembly.

Figure 10A:
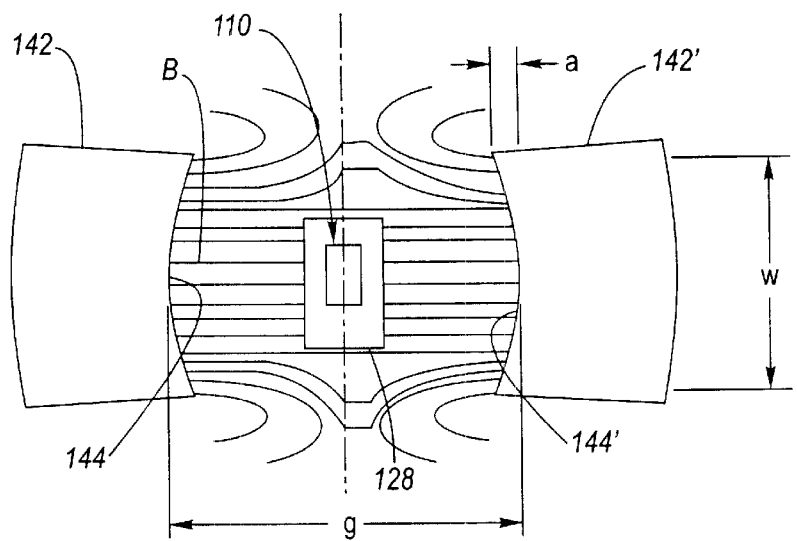
FIG. 10A is a first magnetic field diagram of the analog angle encoder similar to that of FIG. 6, now with arcuate magnets in place of rectangular magnets.
Figure 10B:
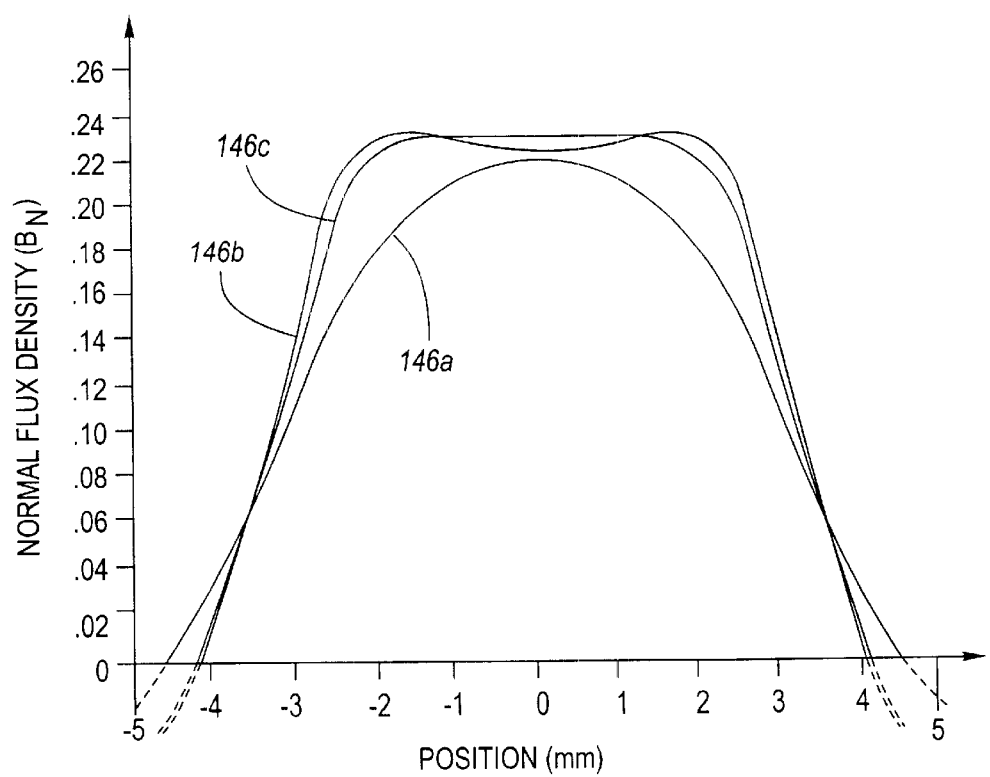
FIG. 10B are graphs of magnetic field density as a function of gap for various magnet widths for the analog angle encoder of FIG. 10A.

Referring now to FIGS. 10A and 10B, a design with arcuately shaped magnets will be detailed.

It was already mentioned that near the magnet edges, the magnetic field tends to turn around towards the back of the magnet rather than crossing the air gap. FIG. 10A depicts a broken-away view of an analog angle encoder according to the present invention, wherein the first and second magnets 142, 142' are provided with an arcuate shape, wherein the mutually facing pole faces 144, 144' are concavely shaped. The advantage of magnet arcuates is to bring the magnet edges closer to one another and thereby reduce leakage towards the back. The arcuates are defined by the amount of concave deflection a.

The effect of arcuating the magnets on the resulting magnetic field is shown at FIG. 10B, which plots the calculated flux density component perpendicular to the magnet surface for two 6 mm wide Vacomax model 145S magnets having a length of 3 mm and wherein the air gap g is equal to 4 mm (there being no iron). By comparison, plot 146a is the result for rectangular magnets, plot 146b is the result for arcuate magnets with a 0.1 mm deflection, and plot 146c is the result for arcuate magnets with a=0.6 mm deflection. The rectangular magnet plot yields a bell shaped curve, while the arcuate magnet plots yield either a flat or even slightly concave plot characteristic. Therefore, a much smaller arcuate magnet can provide the desired uniform magnetic field.

Note that the air gap g is defined in the middle of the magnet pole face center and not at the edges of the pole face. The air gap is thus shorter at magnet pole face edges. This is not a restriction for the following reason. As mentioned earlier, since the present invention is an angular position sensor, the magnetosensitive device is set within a cylindrical package, such as plastic central post, around which the magnet assembly is free to rotate. The clearance between the magnets and the magnetosensitive device is thus defined in a circular fashion, with the center of the circle in the center of the assembly (and center of FIG. 10A).

For the calculations that led to FIG. 10B, each of the magnet arcuates was defined with both back and front sides of the magnet being arcs of a circle with the same radius front and back. The magnet sides were radii of the circle defining the backside. However, these various details are not important here. They may be decided based on various factors. For instance, if they can be stacked up, it will be easier to magnetize them in a batch process. Also, it may be preferable to round off the magnet pole face edges to avoid breakage (magnet material is typically brittle). In the end, however, the main point of the invention is that thanks to the generally arcuate shape, the magnet edges are in closer proximity of one another than with rectangularly shaped magnets. Fundamentally, the idea expressed by FIG. 10A may thus be summarized as follows: Two magnets define an air gap therebetween, wherein the air gap is substantially shorter between the magnet pole faces edge-to-edge than between the magnet pole faces center-to-center.

Figure 11:
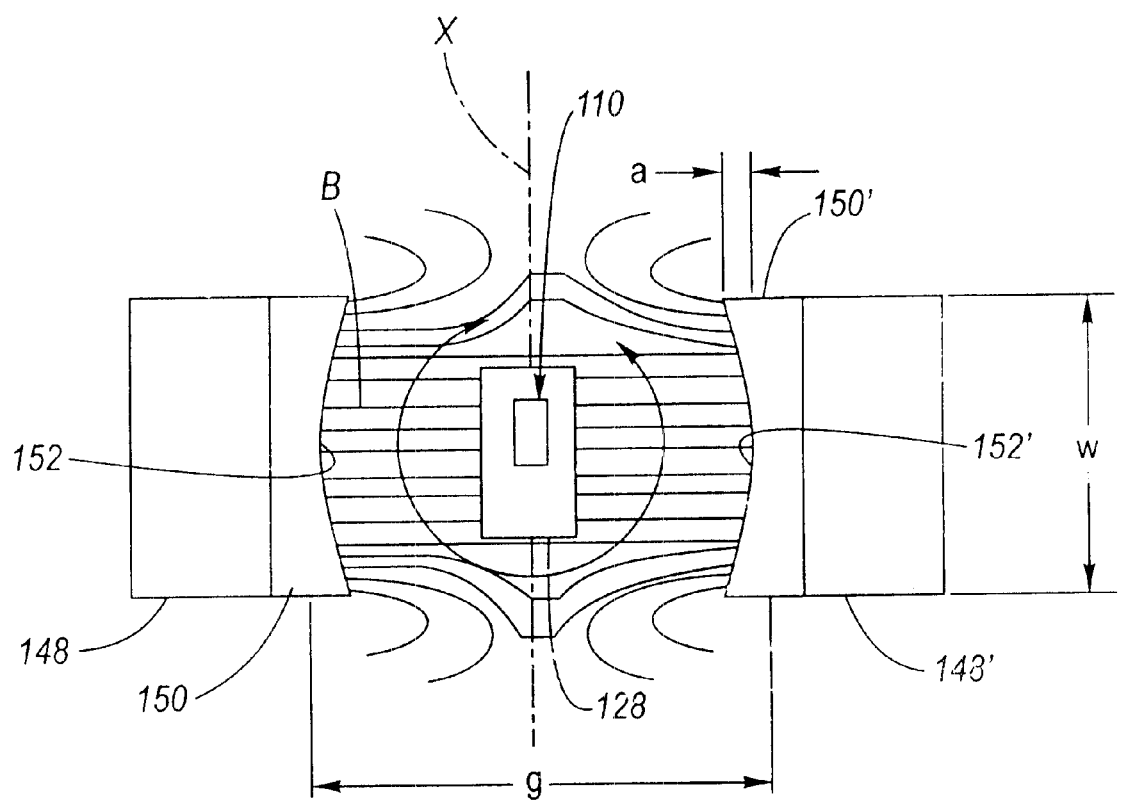
FIG. 11 is a first magnetic field diagram of the analog angle encoder similar to that of FIG. 6, but now with the addition of a concave (arcuate) ferromagnetic pole piece at each magnet face.

It is also fit to state that the ferromagnetic layer concept could be used on arcuate magnets in order to blend the respective advantages of these two configurations, as shown at FIG. 11. First and second magnets 148, 148' have arcuate ferromagnetic layer pole pieces 150, 150' located at their respective pole faces. The faces 152, 152' of the arcuate ferromagnetic layers serve to make the magnetic field more uniform under the principles generally elaborated with respect to FIGS. 10A and 10B.

It is generally preferable for the magnet to rotate around the sensor(s) in order to make for easy connections to the sensor supply and processing electronics. However, one could also design the proposed sensor with stationary magnets and rotating magnetosensitive device(s), especially in those cases where a limited rotation is being sensed. Further in this regard, not only can the roles of stator and rotor be reversed from that shown the Drawing, but the stator need not be cup shaped.

Finally, the sake of brevity, the plan views of FIGS. 8A, 9A, 10A and 11 may also be interpreted as plan views of rectangular and cylindrical magnets and pole pieces (FIGS. 9A and 11), thereby obviating the necessity to duplicate rectangular and cylindrical plan views.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An analog angle encoder comprising:

a non-magnetic stator;

at least one magnetosensitive device connected with said stator, said at least one magnetosensitive device having a sensing surface;

a non-magnetic rotor, wherein one of said stator and said rotor is rotatable about a rotation axis, wherein said sensing surface is oriented parallel to said axis of rotation; and a pair of magnets attached to said rotor, said pair of magnets being disposed in mutually diametrically opposed relation relative to the axis of rotation, wherein said pair of magnets have mutually facing pole faces and mutually facing away pole faces, said mutually facing pole faces being of opposite polarity and provide a magnetic field passing through said at least one magnetosensitive device at an orientation normal to said axis of rotation, said mutually facing away poles being free of a ferromagnetic return path;

wherein the magnetic field is substantially uniform over an area at least as large as said sensor surface; and wherein said stator is generally cup-shaped comprising an outer annulus, a disk connected to said annulus and a central post connected to said disk in concentric relation to said outer annulus, said at least one magnetosensitive device being embedded in said central post at a location concentric in relation to said annulus; wherein said rotor is generally ring-shaped and captured between said central post and said outer annulus, said rotor being rotatable about the rotation axis; and wherein each magnet of said pair of magnets is a permanent magnet.

2. The analog angle encoder of claim 1, wherein said mutually facing poles have a width, wherein said mutually facing poles are separated a distance, and wherein a ratio of the width to the distance is substantially three to one.

3. An analog angle encoder comprising:

a non-magnetic stator;

at least one magnetosensitive device connected with said stator, said at least one magnetosensitive device having a sensing surface;

a non-magnetic rotor, wherein one of said stator and said rotor is rotatable about a rotation axis, wherein said sensing surface is oriented parallel to said axis of rotation; and a magnet attached to said rotor, wherein said magnet has a pair of mutually facing away poles, said magnet providing a magnetic field passing through said at least one magnetosensitive device at an orientation normal to said axis of rotation, said mutually facing away poles being free of a ferromagnetic return path;

wherein the magnetic field is substantially uniform over an area at least as large as said sensor surface; and wherein said stator is generally cup-shaped comprising an outer annulus, a disk connected to said annulus and a central post connected to said disk in concentric relation to said outer annulus, said at least one magnetosensitive device being embedded in said central post at a location concentric in relation to said annulus; wherein said rotor is generally ring-shaped and captured between said central post and said outer annulus, said rotor being rotatable about the rotation axis; and wherein said magnet is a permanent magnet.

\* \* \* \* \*